(12) United States Patent
Yao et al.

(10) Patent No.: US 8,552,230 B2
(45) Date of Patent: Oct. 8, 2013

(54) CONVERSION OF CARBOHYDRATES TO HYDROCARBONS

(75) Inventors: Jianhua Yao, Bartlesville, OK (US); Edward L. Sughrue, II, Bartlesville, OK (US); Yun Bao, Bartlesville, OK (US); Kristi Fjare, Bartlesville, OK (US); TiePan Shi, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 610 days.

(21) Appl. No.: 12/912,164

(22) Filed: Oct. 26, 2010

(65) Prior Publication Data

US 2011/0152513 A1 Jun. 23, 2011

Related U.S. Application Data

(60) Provisional application No. 61/288,912, filed on Dec. 22, 2009.

(51) Int. Cl.
*C07C 31/27* (2006.01)

(52) U.S. Cl.
USPC ............... 585/3; 585/240; 585/469; 585/733; 44/313; 44/436; 44/451; 44/452; 44/605

(58) Field of Classification Search
USPC ............... 44/313, 436, 451, 452, 605; 585/3, 585/240–242, 469, 733
See application file for complete search history.

(56) References Cited

U.S. PATENT DOCUMENTS

| | | | |
|---|---|---|---|
| 4,097,367 A | 6/1978 | Haag et al. |
| 4,338,472 A | 7/1982 | Sirkar |
| 4,496,780 A | 1/1985 | Arena |
| 4,503,278 A | 3/1985 | Chen et al. |
| 5,952,259 A | 9/1999 | Drake et al. |
| 6,090,990 A | 7/2000 | Yao et al. |
| 6,291,725 B1 | 9/2001 | Chopade et al. |
| 6,476,218 B1 | 11/2002 | Choque et al. |
| 6,479,713 B1 | 11/2002 | Werpy et al. |
| 6,787,023 B1 | 9/2004 | Mohr et al. |
| 6,841,085 B2 | 1/2005 | Werpy et al. |
| 7,550,634 B2 | 6/2009 | Yao et al. |
| 7,678,950 B2 | 3/2010 | Yao et al. |
| 2003/0119952 A1 | 6/2003 | Werpy et al. |
| 2007/0142633 A1 | 6/2007 | Yao et al. |
| 2007/0175795 A1 | 8/2007 | Yao et al. |
| 2008/0300435 A1 | 12/2008 | Cortright et al. |
| 2009/0217922 A1 | 9/2009 | Fukuoka et al. |
| 2010/0099933 A1 | 4/2010 | Yao et al. |

FOREIGN PATENT DOCUMENTS

WO 02066579 8/2002

OTHER PUBLICATIONS

U.S. Appl. No. 12/849,109, Sughrue et al.
Chianelli et al., "Periodic Trends in Hydrodesulfurization: in Support of the Sabatier Principle" Applied Catalysis, A. vol. 227, pp. 83-96 (2002).
Davda et al., "A Review of Catalytic Issues and Process Conditions for Renewable Hydrogen and Alkanes by Aqueous-phase Reforming of Oxygenated Hydrocarbons Over Supported Metal Catalysts" Appl. Catal. B, 56, 171 (2004).
Hamada et al., "More Propylene in FCC Units" Catalyst Research Center, JGC Catalysts and Chemicals Ltd. (2008).
Huber et al., "Renewable Alkanes by Aqueous-Phase Reforming of Biomass-Derived Oxygenates" Angew. Chem. Int. Ed., 43, 1549-1551 (2004).
Huber et al., "Renewable Alkanes by Aqueous-Phase Reforming of Biomass-Derived Oxygenates", Angew. Chem. 116, 1575-1577 (2004).
Metzger, "Production of Liquid Hydrocarbons from Biomass", Angew. Chem. Int. Ed., 45, 696 (2006).
Cortright, et al., "Hydrogen from catalytic reforming of biomass-derived hydrocarbons in liquid water," Nature. Aug. 29, 2002; 418 (6901): 964-7.
PCT/US10/54104 International Search Report (Form PCT/ISA/220) Dated Dec. 20, 2010.

*Primary Examiner* — Brian McCaig
(74) *Attorney, Agent, or Firm* — Phillips 66 Company

(57) ABSTRACT

Materials and processes for the conversion of carbohydrates and polyols to gasoline boiling range hydrocarbons. Carbohydrates and polyols are reacted in the presence of modified zeolite catalysts to form a reaction product containing non-aromatic and aromatic gasoline boiling range hydrocarbons.

40 Claims, No Drawings

CONVERSION OF CARBOHYDRATES TO HYDROCARBONS

CROSS-REFERENCE TO RELATED APPLICATIONS

This application is a non-provisional application which claims benefit under 35 USC §119(e) to U.S. Provisional Application Ser. No. 61/288,912 filed Dec. 22, 2009, entitled "CONVERSION OF CARBOHYDRATES TO HYDROCARBONS," which is incorporated herein in its entirety.

STATEMENT OF FEDERALLY SPONSORED RESEARCH

None.

FIELD OF THE INVENTION

The present invention relates generally to the conversion of carbohydrates to fuel range hydrocarbons.

BACKGROUND OF THE INVENTION

There is a national interest in the discovery of alternative sources of fuels and chemicals, other than from petroleum resources. As the public discussion concerning the availability of petroleum resources and the need for alternative sources continues, it is anticipated that future government mandates will require transportation fuels to include, at least in part, hydrocarbons derived from sources besides petroleum. As such, there is a need to develop alternative sources for hydrocarbons useful for producing fuels and chemicals.

One possible alternative source of hydrocarbons for producing fuels and chemicals is the natural carbon found in plants and animals, such as for example, in the form of carbohydrates. These so-called "natural" carbon resources (or renewable hydrocarbons) are widely available, and remain a target alternative source for the production of hydrocarbons. For example, it is known that carbohydrates and other sugar-based feedstocks can be used to produce ethanol, which has been used in gasohol and other energy applications. However, the use of ethanol in transportation fuels has not proven to be cost effective.

Carbohydrates, however, also can be used to produce fuel range hydrocarbons. The upgrading of biologically derived materials to materials useful in producing fuels is known in the art. However, many carbohydrates (e.g., starch) are undesirable as feed stocks due to the costs associated with converting them to a usable form. In addition, many carbohydrates are known to be "difficult" to convert due to their chemical structure, or the hydrocarbon product produced is undesirable or will result in low yields of desirable products. Among the compounds that are stated to be difficult to convert include compounds with low effective hydrogen to carbon ratios, including carbohydrates such as starches and sugars, carboxylic acids and anhydrides, lower glycols, glycerin and other polyols and short chain aldehydes.

There has been a significant effort to produce lower polyols through catalytic hydrogenolysis of aqueous sorbitol. Various Group VIII metal hydrotreating catalysts have been discussed including nickel (U.S. Pat. No. 4,338,472), ruthenium (U.S. Pat. Nos. 4,496,780, 6,291,725), and rhenium (U.S. Pat. Nos. 6,479,713, 6,841,085). Alditols including 15-40 wt % sorbitol solution in water are catalytically hydrocracked between 400° to 500° F. and hydrogen partial pressure from 1200 to 2000 pound per square inch gauge (psig) in a fixed bed catalytic reactor using nickel catalyst to produce at least 30 wt % conversion to glycerol and glycol products (U.S. Pat. No. 4,338,472). In U.S. Pat. No. 4,496,780 an alkali promoter such as calcium hydroxide or sodium hydroxide was added to the feedstream solution to control pH, prevent nickel leaching and enhance conversion. Sorbitol was hydrocracked over a supported Group VIII noble metal catalyst with an alkaline earth metal oxide; such ruthenium on a titanium alumina support with barium oxide between 300° to 480° F. at 500 to 5000 psig to produce lower polyols such as glycerol, ethylene glycol, 1,2-propanediol. High molecular weight polyols including sugar alcohols such as sorbitol or xylitol in water with a base promoter underwent hydrogenolysis over a metal catalyst of ruthenium deposited on an alumina, titania, or carbon support between 350° to 480° F. at 500 to 2000 psig hydrogen to produce low molecular weight polyols including glycerol, propylene glycol, and ethylene glycol (U.S. Pat. No. 6,291,725). Five carbon sugars and sugar alcohols including 15-40 wt % sorbitol, and lactic acid were hydrocracked with hydrogen over a rhenium catalyst in water to achieve at least 30 wt % conversion to glycerol and glycol products between 400° and 500° F., between 1200 and 2000 psig hydrogen, and a liquid hourly space velocity of 1.5 to 3.0 (U.S. Pat. No. 6,479,713). Battelle (2005) reacts an aqueous solution of sorbitol with hydrogen over a multi-metallic rhenium catalyst, including Re and Ni, at 250°-375° F. to produce propylene glycol through hydrogenolysis of C—O and C—C bonds (U.S. Pat. No. 6,841,085). These methods are limited by size, temperature, products, and conversion rates. Unfortunately at higher temperatures and higher catalytic activity, these reactions become quickly fouled. The catalyst must be removed and replaced before sufficient volumes of fuel are processed. Thus, these reactions must be improved to meet a commercial production scale and cost effectiveness.

However, these processes are often complex and costly, with reaction products produced during coking oftentimes undesirable. This results in low percentages of desired products, often increasing undesirable byproducts such as carbon monoxide and carbon dioxide. Additionally, the high sugar content and high temperatures of the conversion process introduce unique coking issues when converting carbohydrates to sugar alcohol (also known as a polyol, polyhydric alcohol, or polyalcohol) and gasoline boiling range hydrocarbons. Frequently, improving catalyst activity is difficult because not all improvements are additive, many can have unforeseen detrimental effects leading to increased byproduct formation, increased coke formation, decreased catalyst life, and an inability to regenerate fouled catalysts. As such, developing a carbohydrate conversion process resulting in a product with reduced byproducts such as carbon monoxide, carbon dioxide, and coke production, would be a significant contribution to the art.

BRIEF SUMMARY OF THE DISCLOSURE

One object of the present invention is to provide a process for the conversion of carbohydrates and polyols to hydrocarbons in which the rate of coke formation and the production of COx by-products during the conversion is minimized.

In one embodiment, a method of converting carbohydrates to polyols and gasoline boiling range hydrocarbons is described by contacting a zinc-platinum or cobalt-molybdenum impregnated zeolite catalyst (ZnPt-zeolite or CoMo-zeolite) with a carbohydrate or polyol; reacting the carbohydrate or polyol on the catalyst to produce polyols and hydrocarbons; and separating the polyols and hydrocarbons, to get gasoline boiling range hydrocarbons that boil between approximately −20° C. and 220° C.

In another embodiment, carbohydrates are converted to gasoline boiling range hydrocarbons by contacting a zinc-platinum or cobalt-molybdenum impregnated zeolite (ZnPt-zeolite or CoMo-zeolite) catalyst with a carbohydrate; reacting the carbohydrate on the catalyst to produce hydrocarbons; and purifying the hydrocarbons in the gasoline boiling range between approximately −20° C. and 220° C. from the reaction.

Additionally, a method of converting polyols to gasoline boiling range hydrocarbons is demonstrated by contacting a zinc-platinum or cobalt-molybdenum impregnated zeolite catalyst with polyols; reacting the polyols on the catalyst to produce hydrocarbons; and purifying the hydrocarbons from the reaction to obtain hydrocarbons in the gasoline boiling range between approximately −20° C. and 220° C.

A method of converting polyols to hydrocarbons by contacting a acid leached zeolite catalyst impregnated with zinc, cobalt, molybdenum, and/or platinum; reacting the polyols on the catalyst to produce hydrocarbons, and purifying hydrocarbons from the reaction, where the reaction temperature is between 400 and 550° C., the reaction pressure is between 1 and 250 psig, and the feedstock flow rate is between approximately 0.1 and 5 ml/hr/g catalyst.

Carbohydrates include starches, polysaccharides, monosaccharides, dextrose, mannose, galactose, fructose, sucrose, and combinations as well as those not listed here. Polyols include maltitol, sorbitol, xylitol, isomalt, isomers, and combinations as well as those not listed here. Zeolite catalysts include HZSM-5, ZSM-5, ZSM-8, ZSM-11, ZSM-12, ZSM-35, ZSM-38, MFI, Pentasil, and many others. The reaction may generate polyols and hydrocarbons with C1, C2, C3, C4, C5, C6, C7, C8, C9, C10, C11, C12 hydrocarbons, or isomers thereof. These hydrocarbons include gasoline boiling range hydrocarbons that boil between approximately minus 20° C. to 220° C., between approximately minus 20° C. to 120° C., between approximately minus 20° C. to 196° C., between approximately 35° C. to 160° C., and between approximately 140° C. to 220° C. Some examples of gasoline boiling range hydrocarbons include toluene, xylene, pentane, trimethylbenzenes, benzene, butane, ethylbenzene, heptane, cyclohexane, hexane, octane, ethanol, naphthalene, trimethylbenzene 1,2,4, isopentane, styrene, methyl tert-butyl ether (MTBE), ethyl tert-butyl ether, tertiary amyl-methyl ether, alkanes, cycloalkanes, alkenes, and aromatic hydrocarbons.

The feedstock may be an aqueous solution between 30 and 95% polyol. The feedstock may be co-fed with between approximately 1 and 2.5 ml/hr/g catalyst liquid co-feed, including co-feeds of methanol or pentane. In one embodiment, the reaction may be approximately 450° C. at approximately 200 psig with a feedstock of 70% sorbitol at 1.3 ml/hr per gram catalyst. The co-feed can be 1.5 ml/hr of methanol per gram catalyst.

Alternatively, the reaction may be approximately 500° C. at approximately 14 psig, with a feedstock of 50% sorbitol at approximately 3 ml/hr per gram catalyst. The reaction may also have a co-feed of 1.6 ml/hr isopentane per gram catalyst.

BRIEF DESCRIPTION OF THE DRAWINGS

None.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

In US20070142633, a process for the conversion of carbohydrates to gasoline boiling range hydrocarbons is disclosed, and processes for increasing the solubility of carbohydrates used in such processes are disclosed. The solubility of carbohydrates may be increased by contacting the carbohydrate with an ion-exchange resin. The dissolved product may be hydrogenated and reacted in the presence of a catalyst to form a reaction product containing non-aromatic and aromatic gasoline boiling range hydrocarbons. Provisional U.S. application 61/236,347, describes hydrotreating a mixture of sorbitol and diesel over a commercial hydrotreating catalyst to produce lighter alkanes and hexanes desirable for gasoline fuels. U.S. Pat. No. 6,090,990 describes an improved catalyst containing a mixture of zeolite and a binder treated with boron trichloride which when used in the conversion of hydrocarbons to ethylene, propylene and BTX (benzene, toluene, xylene and ethylbenzene) aromatics. U.S. Pat. No. 7,550,634 describes hydrotreating triglycerides to fuel range hydrocarbons. These patents and applications are specifically incorporated by reference in their entirety.

Carbohydrates, such as starches and sugars may be converted in accordance with the present invention to form a hydrocarbon mixture useful for liquid fuels and chemicals. The term, "carbohydrate" is used generally to refer to a compound of carbon, hydrogen and oxygen having the general formula $C_x(H_2O)_y$, in which the ratio of hydrogen to oxygen is the same as in water. Carbohydrates include monosaccharides, polysaccharides, and mixtures of monosaccharides and/or polysaccharides. The term "monosaccharide" or "monosaccharides" are generally hydroxy aldehydes or hydroxy ketones which cannot be hydrolyzed into any simpler carbohydrate. Monosaccharides can be a triose with 3 carbon atoms, tetrose with 4 carbon atoms, pentose with 5 carbon atoms, hexose with 6 carbon atoms, or larger monosaccharides like Sedoheptulose with 7 carbon atoms or Neuraminic acid with 9 carbon atoms. Examples of monosaccharides include glyceraldehyde, erythrose, xylose, dextrose, glucose, fructose and galactose. The term "polysaccharide" or "polysaccharides" include those saccharides containing more than one monosaccharide unit. This term also includes disaccharides (such as sucrose, maltose, cellobiose, and lactose) and oligosaccharides.

Generally, carbohydrates are characterized as having overall effective hydrogen to carbon ratio of about zero, although some carbohydrates have an overall effective hydrogen to carbon ratio greater than zero. The effective hydrogen to carbon ratio may be determined by the gross composition of the carbohydrate starting material according to the formula:

$$(H/C)_{eff} = (H - 2(O) - 3(N) - 2(S))/C$$

where H, C, O, N, and S are the relative atom ratios of hydrogen, carbon, oxygen, nitrogen and sulfur as determined by elemental analysis on an anhydrous basis as described in U.S. Pat. No. 4,503,278. For example, the approximate chemical formula for starch is $(C_6H_{10}O_5)_n$. Inserting the appropriate values in the above equation gives:

$$H/C_{eff} = (10 - 2(5) - 3(0) - 2(0))/10 = 0/10 = 0$$

Useful carbohydrates in the present invention include, but are not limited to, carbohydrates that can be converted to hydrocarbons when contacted under suitable reaction conditions. The carbohydrate starting material may be insoluble in an aqueous medium such as water, substantially insoluble in an aqueous medium, or partially insoluble in an aqueous medium. In addition, carbohydrates useful in the present invention may be soluble in an aqueous medium, substantially soluble in an aqueous medium, or partially soluble in an aqueous medium. In addition, carbohydrates useful in the present invention may be in a pure form, or may be mixed with other components, including but not limited to, additives. Examples of carbohydrates useful as starting materials in accordance with the present invention include, but are not limited to, polysaccharides such as sucrose, maltose, lactose, cellobiose, melibiose, raffinose, starch (e.g., corn starch or other starches derived from other cereal grains such as wheat and rice, or those from tubers, such as potato, tapioca, and arrowroot, or those that are waxy starches such as waxy corn, maize and rice) and starch decomposition products such as dextrin and corn syrup (also known as glucose syrup).

In one embodiment of the present invention, insoluble starch (e.g., cornstarch) is used as the starting material. Starch, in its native form, is insoluble in water. Cornstarch may be found, for example, within corn kernels as a long polymer polysaccharide composed of two structural classes: amylose and amylopectin. Amylose, which is about 25% of the cornstarch, is water soluble while amylopectin, which is about 75% of the cornstarch, is insoluble.

In another embodiment of the present invention, corn syrup (sometimes referred to as glucose syrup) is used as the starting material. Corn syrup generally is a mixture of glucose, maltose, and maltodextrins and produced by the acid hydrolysis of starch. Generally, in the production of corn syrup, the starch source (e.g., corn) is suspended in water and liquefied in the presence of acid and/or enzymes that convert the starch first, to a mixture of glucose, maltose, and higher saccharides. Throughout the process, the processor may halt the actions of the acid or enzyme to produce the proper mixture of sugars for syrups to meet different needs. The degree of conversion of the starch varies, with a consequent effect on the dextrose equivalent (D.E.) or reducing power of the syrup. Thus, corn syrups generally have a range of molecular compositions, rather than a specific molecular composition.

In one embodiment of the present invention, carbohydrates may optionally be first hydrolyzed in a liquid medium such as water. It is understood that carbohydrates may not need to be hydrolyzed, as the carbohydrate or carbohydrate-containing material may be in a suitable aqueous form for processing and for converting the carbohydrate to a hydrocarbon product. In one embodiment of the present invention, the solubility of a carbohydrate, such as for example a polysaccharide such as starch, in a liquid medium may be increased by contacting the carbohydrate with an ion-exchange resin under a condition sufficient to partially, substantially, or completely, dissolve the carbohydrate in the liquid medium. In another embodiment of the present invention, the solubility of the carbohydrate in a liquid medium may be increased by contacting a carbohydrate with an ion-exchange resin in a liquid medium to form a mixture, and heating the mixture at a temperature sufficient to partially, substantially, or completely dissolve the mixture in the liquid medium.

The amount of carbohydrate used as the starting material in the present invention will vary depending on the size of the commercial process or suitability of the mixing/reaction vessel. Generally, when combined with water or other liquid at elevated temperatures, carbohydrates such as starch granules absorb water and swell to many times their original size thus making the gelatinized or swollen product very viscous. For example, when starch is used as a starting material in a solid form, the starch may contain in the range of from about 10 to about 90% solid particle, in relation to the percentage of liquid medium. In one embodiment of the present invention, the carbohydrate/liquid medium ratio is the range of from about 10 to about 80 weight percent, based on the total weight of the carbohydrate/liquid medium mixture. In another embodiment of the present invention, the carbohydrate/liquid medium ratio is the range of from about 15 to about 70 weight percent, based on the total weight of the carbohydrate/liquid medium mixture. In another embodiment of the present invention, the carbohydrate/liquid medium ratio is the range of from about 20 to about 60 weight percent, based on the total weight of the carbohydrate/liquid medium mixture.

Carbohydrates useful in the present invention may be dissolved in any aqueous reaction medium, including water. In addition reaction of carbohydrates with ion-exchange resins in accordance with US20070142633 may be carried out in any suitable apparatus that enables intimate contact of the reactants and control of the operating conditions. The process may be carried out in batch, semi-continuous, or continuous operation. In one embodiment, a batch operation in a conventional autoclave is used.

In one example, catalysts in the present invention include catalysts used to produce a hydrogenated product in the conversion of carbohydrates to hydrocarbons. Hydrogenation catalysts may include those containing an active metal on a support material. Examples of suitable metals include, but are not limited to, platinum, palladium, nickel, copper, iron, cobalt, zinc, lead, tin, mercury, ruthenium, metal alloys, and combinations thereof.

Zeolites as used herein include any one of a family of hydrous aluminum silicate minerals, whose molecules enclose cations of sodium, potassium, calcium, strontium, barium and the like. These cations can be exchanged to hydrogen form to produce acidic zeolite, In one embodiment, a ZSM-5 zeolite (also known as Pentasil) is used. Other zeolites include Amicite; Analcime; Barrerite; Bellbergite; Bikitaite; Boggsite; Brewsterite; Chabazite; Clinoptilolite; Cowlesite; Dachiardite; Edingtonite; Epistilbite; Erionite; Faujasite; Ferrierite; Garronite; Gismondine; Gmelinite; Gobbinsite; Gonnardite; Goosecreekite; Harmotome; Herschelite; Heulandite; Laumontite; Levyne; Maricopaite; Mazzite; Merlinoite; Mesolite; Montesommaite; Mordenite; Natrolite; Offretite; Paranatrolite; Paulingite; Perlialite; Phillipsite; Pollucite; Scolecite; Sodalite; Sodium Dachiardite; Stellerite; Stilbite; Tetranatrolite; Thomsonite; Tschemichite; Wairakite; Wellsite; Willhendersonite; and Yugawaralite.

The metal of the hydrogenation catalyst useful in the present invention is usually distributed over the surface of a support in a manner that maximizes the surface area of the metal. Examples of suitable support materials for the hydrogenation catalysts include, but are not limited to, silica, silica-alumina, aluminum oxide ($Al_2O_3$), silica-magnesia, silica-titania, titania, zeolite, carbon or other support materials as well as acidic zeolites of natural or synthetic origin. The metal catalyst may be prepared by any method known in the art, including combining the metal with the support using conventional means including but not limited to impregnation, ion exchange and vapor deposition. In one embodiment of the present invention, the catalyst contains ruthenium supported on alumina. In another embodiment of the present invention, the catalyst contains ruthenium supported on an ion-exchange resin (such as for example, Amberlite™ 120(H) commercially available from Rohm and Haas). Generally, the use of an ion-exchange resin as the support may allow the conversion of a generally non-hydrolyzed carbohydrate-containing compound (such as for example, starch) to be hydrolyzed and hydrogenated in one step by contacting the non-hydrolyzed carbohydrate-containing compound with a ruthenium/ion-exchange resin catalyst under a condition sufficient to form a hydrolyzed/hydrogenated product.

The zeolite catalyst employed in the present invention may vary over a wide range and will depend upon the particular catalyst, carbohydrate, polyol, temperature and pressure which are employed in the process. Commercial refining catalysts are readily available from a variety of sources including ALBEMARLE, ADVANCED REFINING TECHNOLOGIES (ART), PGM CATALYSTS & CHEMICALS, AMERICAN ELEMENTS, EURECAT, FISCHER, HALDOR TOPSOE, HEADWATER, SIGMA, and other chemical suppliers. Catalysts may be microsized, nanosized, fluidized or other catalyst forms dependent upon the reactor size, shape and conditions under which the reaction is run. The catalysts may also be unsupported including unsupported zeolite powders impregnated with Zn, Pt, Co, Mo, W, Ni, Ti, Zn/Pt, Co/Mo, Co/W, Ni/Mo, Ni/W, Ti/Mo, Ti/W, Co/Mo/W, Ni/Mo/W, Ti/Mo/W and the like are used for conversion of polyols and carbohydrates to yield increased hydrocarbons including hexanes, pentanes, cyclopentanes and other higher octane products. In one embodiment Zn/Pt impregnated zeolite pellets are used in fixed bed reactor with single catalyst loading or layered catalyst loading. In another embodiment, a Co/Mo impregnated solid zeolite support is used for continuous flow through reactions. Additionally, one embodiment includes acid leaching a solid extruded zeolite catalyst and impregnating it with Zn, Co, ZnPt, or CoMo for use in a fixed bed reactor. Finally, a powdered zeolite catalyst is impregnated with Co, Mo, Zn and/or Pt to create a fluidized bed catalyst.

Reaction, or conversion, conditions for contacting a hydrolyzed, substantially hydrolyzed, or completely hydrolyzed carbohydrate-containing material and/or non-hydrolyzed carbohydrate-containing material includes a reaction temperature in the range of from about 300° C. to about 800° C. In another embodiment of the present invention, the temperature is in the range of from about 400° C. to about 600° C. In another embodiment of the present invention, the temperature is in the range of from about 450° C. to about 550° C. In another embodiment of the present invention, the temperature is in the range of from about 450° C. to about 500° C. Reaction temperatures may vary by as much as 10 to 50° C. dependent upon temperature variations in the feedstocks, size of the reaction, and heat sources used. The reaction may be conducted at approximate temperatures of 300° C., 325° C., 350° C., 375° C., 400° C., 425° C., 450° C., 475° C., 500° C., 525° C., 550° C., 575° C., 600° C., 650° C., 700° C., 750° C. up to about 800° C.

The reaction, or conversion, conditions for contacting a hydrolyzed, substantially hydrolyzed, or completely hydrolyzed carbohydrate-containing material and/or non-hydrolyzed carbohydrate-containing material includes a pressure in the range of from about 0 pounds per square inch gauge (psig) to about 1000 psig. In one embodiment of the present invention, the pressure is in the range of from about 15 to about 500 psig. In another embodiment of the present invention, the pressure is in the range of from about 50 to about 400 psig. In still another embodiment of the present invention, the pressure is in the range of from about 100 to about 200 psig. The reaction may also be conducted at atmospheric pressure (101.325 kPa) of approximately 14.730 psig, or between 13 and 16 psig dependent upon the altitude, temperature and current barometric pressure. Reaction pressures may vary by as much as 100 psig dependent upon temperature variations in the feedstocks, type of reaction bed, size of the reaction, gas/liquid/solid phase changes, and other reaction factors.

The reaction may be conducted at approximate pressures of 1 psig, 5 psig, 10 psig, 15 psig, 20 psig, 25 psig, 50 psig, 75 psig, 100 psig, 125 psig, 150 psig, 175 psig, 200 psig, 250 psig, 300 psig, 350 psig, 400 psig, 450 psig, 500 psig, 550 psig, 600 psig, 650 psig, 700 psig, 750 psig, 800 psig, 850 psig, 900 psig, 950 psig up to about 1000 psig. Pound per square inch gauge (psig) may be easily converted to Pascals (1 psig=$6.894 \times 10^3$ Pa), bar (1 psig=$68.948 \times 10^3$ bar), technical atmosphere (1 psig=$70.307 \times 10^{-3}$ at), atmosphere (1 psig=$68.046 \times 10^{-3}$), or torr (1 psig=51.715 torr) using a simple conversion available in the CRC Handbook of Chemistry and Physics, incorporated herein by reference.

The carbohydrate-containing material may be contacted with a suitable gas, such as for example, hydrogen, in order to form a hydrogenated product. The gas may be introduced into the reaction chamber under pressure, which may vary with the nature of the reactants and the hydrogenation catalyst employed. The gas may be charged to the reaction vessel at any rate, pressure, and/or temperature that is suitable for the reaction.

The time of reaction will depend upon the specific starting material, concentration, the specific catalyst used, pressure and temperature. Generally, the duration of reaction is in the range of from about 20 minutes to about 120 minutes, which may be shorter or longer depending on the starting materials, amount and type of conversion, and products produced. Reaction times may be approximately 10, 25, 50, 75, 100, 125, 150, 175, 200, 250, 500, 750, up to 1000 minutes. Reaction time may also be measured as a residency time in a continuous or semi-continuous system. The reaction is carried out in any suitable apparatus or reaction chamber which enables intimate contact of the reactants and control of the operating conditions. The process may be carried out in batch, semi-continuous, or continuous operation. In one embodiment of the present invention, a batch operation in a conventional autoclave is used. The reactants may be added to the reaction chamber in any suitable manner or in any suitable order. In one embodiment of the present invention, the hydrogenation catalyst is added to the carbohydrate-containing solution, and thereafter, fed with hydrogen. In another embodiment a reaction chamber with a fixed bed catalyst is co-fed with both the carbohydrate solution and reaction gas simultaneously. Pressure and temperature are monitored and adjusted as required.

Liquid products from conversion are believed to contain, among other things, polyhydric alcohols of the respective monosaccharide sugar. For example, when cornstarch (whose basic structural components consist of glucose units), is hydrolyzed and hydrogenated, the resulting reaction product contains the polyhydric alcohol-sorbitol. A variety of polyols may be produced including maltitol, sorbitol, xylitol, isomalt, and other sugar alcohols and isomers of those sugar alcohols. Polyols are converted to a variety of gasoline boiling range hydrocarbons. Because the conversion reaction forms carbon-carbon bonds under these conditions, approximately 300 to 800° C. at about 0 to 1000 psig, the products can be longer chain hydrocarbons that are either branched or cyclized. Increasing hydrocarbon length and the number of aromatic hydrocarbons increases the value of these polyols by creating gasoline boiling range hydrocarbons.

Gasoline or gasoline boiling range hydrocarbons as used herein include hydrocarbons with between 4 and 12 carbon atoms or more per molecule, including hydrocarbons predominantly in the range of C5 through C8 as well as raw hydrocarbons that may be further processed. Gasoline hydrocarbons may include naphthas, straight-run gasolines, and other distillates. In one embodiment gasoline boiling range hydrocarbons are predominantly in the range of C4 through C8 boiling in the range of approximately minus 20° C. to 120° C. (−4° F. to 248° F.). Also known as motor fuel, motor spirits, natural gasoline, petrol gasoline hydrocarbons include pentanes, pentenes, pentynes, hexanes, hexenes, hexynes, heptanes, heptenes, heptynes, octanes, octenes, octynes and other hydrocarbons either linear, branched, cyclic, or isomer hydrocarbons with a boiling range between approximately −20° C. and 220° C. (−4° F. and 428° F.). A variety of hydrocarbons may be produced during the conversion of carbohydrates into hydrocarbons including hydrocarbons in the C4 through C11 and boiling in the range of approximately −20° C. to 196° C. (−4° F. to 384° F.), C5 through C10 and boiling in the range of approximately 35° C. to 160° C. (95° F. to 320° F.), C9 through C12 range and boiling in the range of approximately 140° C. to 220° C. (284° F. to 428° F.), and hydrocarbon products will be dependent upon the carbohydrate feedstock used. Some specific gasoline hydrocarbons include toluene, xylene, pentane, trimethylbenzenes, benzene, butane, ethylbenzene, heptane, cyclohexane, hexane, octane, ethanol, naphthalene, trimethylbenzene 1,2,4, isopentane, styrene, methyl tert-butyl ether (MTBE), ethyl tert-butyl ether, tertiary amyl-methyl ether, alkanes, cycloalkanes, alkenes, and aromatic hydrocarbons.

In accordance with the present invention, a hydrogenated carbohydrate-containing product may be contacted with a suitable zeolite catalyst composition under a condition sufficient to produce a reaction product containing gasoline boiling range hydrocarbons. In addition, in accordance with the present invention, a non-hydrogenated carbohydrate-containing material may be contacted with a suitable zeolite catalyst composition under a condition sufficient to produce a reaction product containing gasoline boiling range hydrocarbons. In accordance with the present invention, a hydrogenated carbohydrate-containing product, or a non-hydrogenated carbohydrate-containing product, or mixtures thereof, may be combined with an additional alkane, such as for example, iso-pentane, and thereafter, contacted with a suitable zeolite catalyst composition under a condition sufficient to produce a reaction product containing gasoline boiling range hydrocarbons.

Generally, suitable hydrogenated carbohydrate-containing products, or non-hydrogenated carbohydrate-containing products, or mixtures thereof, useful in the present invention, include but are not limited to, carbohydrate-containing materials that are hydrolyzed, substantially hydrolyzed, or completely hydrolyzed, and those that have not been hydrolyzed. In addition, suitable hydrogenated carbohydrate-containing products, or non-hydrogenated carbohydrate-containing products, or mixtures thereof, useful in the present invention, include, but are not limited to, materials containing polysaccharides and/or monosaccharides, such as for example, dextrose, mannose, galactose, fructose and sucrose, and products derived from hydrolyzed polysaccharides such a starch. Other suitable carbohydrate-containing materials include, but are not limited to, corn syrup and related products, as well as oxygenated hydrocarbon compounds, such as for example, lactic acid and sorbitol.

Carbohydrate-containing products, which may be hydrolyzed, hydrogenated, or both hydrolyzed and hydrogenated, may be contacted with a catalyst composition containing a zeolite under a condition sufficient to produce a reaction product containing gasoline boiling range hydrocarbons. Useful catalyst compositions in the present invention include zeolites or zeolite material effective in the conversion of carbohydrates to hydrocarbons when contacted under suitable reaction conditions. Examples of suitable zeolites include, but are not limited to, those disclosed in Kirk-Othmer Encyclopedia of Chemical Technology, third edition, volume 15, pages 638-669 (John Wiley & Sons, New York, 1981), incorporated herein by reference. Generally, zeolites useful in the present invention have a constraint index (as defined in U.S. Pat. No. 4,097,367, which is incorporated herein by reference) in the range of from about 0.4 to about 12, and preferably in the range of from about 2 to about 9. In addition, the molar ration of $SiO_2$ to $Al_2O_3$ in the crystalline framework of the zeolite is at least about 5:1 and can range up to infinity. In one embodiment of the present invention, the molar ratio of $SiO_2$ to $Al_2O_3$ in the crystalline framework of the zeolite is in the range of from about 8:1 to about 200:1. In another embodiment of the present invention, $SiO_2$ to $Al_2O_3$ in the crystalline framework of the zeolite is in the range of from about 12:1 to about 100:1. Some zeolites useful in the present invention include but are not limited to ZSM-5, ZSM-8, ZSM-11, ZSM-12, ZSM-35, ZSM-38 and combinations thereof. Some of these zeolites are also known as "MFI" or "Pentasil" zeolites. In one example, the zeolite HZSM-5 purchased from UCI (United Catalysts, Inc., Louisville, Ky.) having a designate of T-4480 (obtained as a 1/16 inch extrudate) was used. Modified zeolites can also be used. Modified zeolites can include zeolites modified by metal cations, such as, for example, zinc, platinum, gallium, or nickel. Zeolites can also be modified by steam treatment, acid treatment, base treatment, as well as other treatments alone or in combination. In addition, zeolites of the present invention may be combined with a clay, promoter, and/or a binder. Zeolites useful in the present invention may also contain an inorganic binder (also referred to as matrix material) selected from the group consisting of alumina, silica, alumina-silica, aluminum phosphate, clays (such as bentonite), and combinations thereof. The type of zeolite used may cause the final product to vary dependent upon starting materials, reaction conditions, and length of reaction.

Reaction, or conversion, conditions for contacting a carbohydrate-containing material, whether or not such material has been hydrolyzed and/or hydrogenated, includes a reaction temperature in the range of from about 100° C. to about 1000° C. In another embodiment of the present invention, the temperature is in the range of from about 150° C. to about 800° C. In another embodiment of the present invention, the temperature is in the range of from about 200° C. to about 600° C. In another embodiment of the present invention, the temperature is in the range of from about 300° C. to about 500° C. The reaction, or conversion, conditions for contacting a carbohydrate-containing material, whether or not such material has been hydrolyzed and/or hydrogenated, includes a pressure in the range of from about 1 psig to about 500 psig. In one embodiment of the present invention, the pressure is in the range of from about 3 to about 400 psig. In another embodiment of the present invention, the pressure is in the range of from about 5 to about 200 psig.

The carbohydrate-containing material, whether or not such material has been hydrolyzed and/or hydrogenated, may be contacted with a suitable gas, such as for example, hydrogen or nitrogen in order to form a product containing hydrocarbons. The gas may be introduced into the reaction chamber under pressure, which may vary with the nature of the reactants and the zeolite catalyst employed. The flow rate may vary depending on the specific reaction conditions and include flow rates of approximately 1, 2, 3, 4, 5, 7.5, 10, 12.5, 15, 17.5, 20, 30, 50, 75, 100 up to about 1150 ml/min for 8 grams of catalyst. In one embodiment of the present invention, the flow rate is between approximately 11 ml/min to 55 ml/min per gram of catalyst, preferably between 1.25 and 2.50 ml/mg per gram of catalyst. Thus, using the embodiments described above, 10 g of catalyst could be run with a flow rate between about 1 ml/min and about 50 ml/min, preferably between about 12.5 ml/min and 25 ml/min. The viscosity of the fluid, temperature of the reaction, and porosity of the catalyst can all influence the flow rate, under certain circumstances, low viscosity, higher temperatures, and increased catalyst porosity, the flow rate can be increased to about 12.5 ml/min, 15 ml/min, 17.5 ml/min or up to 20 ml/min per gram of catalyst.

The time of reaction will depend upon the specific starting material, concentration, the specific catalyst used, pressure and temperature. Generally, the liquid hourly space velocity is in the range of from about 0.1 to about 10 $hr^{-1}$, which may be lower or higher depending on the desired conversion. The reaction is carried out in any suitable type of apparatus or reaction chamber which enable intimate contact of the reactants and control of the operating conditions. The process may be carried out in batch, semi-continuous, or continuous operation. In one embodiment of the present invention, a batch operation in a conventional autoclave is used. The reactants may be added to the reaction chamber in any suitable manner or in any suitable order. In one embodiment of the present invention, the carbohydrate-containing solution is fed through the zeolite catalyst.

The process effluent, from the conversion zone, in accordance with the present invention, generally may contain gas and liquid fractions containing hydrocarbon products, which include, but are not limited to, a light gas fraction containing hydrogen, and methane, a $C_2$-$C_3$ fraction containing ethane, propane, ethylene, and propylene, an intermediate fraction including non-aromatic compounds having greater than 3 carbon atoms, a BTX aromatic hydrocarbons fraction (containing benzene, toluene, ortho-xylene, meta-xylene, and para-xylene) and a $C_9$-$C_{13}$+ fraction containing aromatic compounds having 9-13 or more carbon atoms per molecule.

In addition, the process effluent of the present invention may also contain by products of carbon monoxide and carbon dioxide ($CO_x$). According to one embodiment of the present invention, the hydrocarbon product contain less $CO_x$, and less coke and other undesirable products are produced, when the reaction conditions are modified, for example, when the reaction conditions are at pressures generally in the range of from about 100 psig to about 200 psig. In addition, it has been discovered that higher reaction pressures, preferably at about 200 psig, result in the production of less $CO_x$ (preferably less than about 25 weight percent of the product), less coke, and upgrading of the hydrocarbon stream to a higher-octane gasoline.

The following examples of certain embodiments of the invention are given. Each example is provided by way of explanation of the invention, one of many embodiments of the invention, and the following examples should not be read to limit, or define, the scope of the invention.

Impregnating a Zeolite Catalyst

A modified ZSM-5 catalyst is prepared by acid leaching a commercial ZSM-5 catalyst (T-4480) followed by CoMo impregnation. The catalyst may be acid leached in an aqueous solution similar to the procedures described in U.S. Pat. No. 5,952,259; 80.0 g of ZSM-5 zeolite (T-4480) was combined with 800 ml of 6N HCl in a beaker to form a suspension. The suspension was heated at 85° C. for 100 minutes. Upon decantation of spent HCl solution, the solid was washed, dried at 120° C., and calcined at 540° C. for 3 hours to prepare 58.5 g of acid-leached zeolite. The zeolite was then impregnated with ammonium molybdate tetrahydrate and cobalt nitrate hexahydrate aqueous solution. The sample was then dried at 120° C. overnight and calcined at 450° C. for 6 hours to produce the final catalyst. The final catalyst contains about 3.2 wt % of Co and 12.2 wt % of Mo.

TABLE 1

Zeolite acid leaching and CoMo Impregnation

| Catalyst | Leach Soln. | Leach Time (Min) | Impregnation Soln. (aqueous) | Total Co (wt %) | Total Mo (wt %) | Co/Mo molar ratio | CoMo (wt %) |
|---|---|---|---|---|---|---|---|
| Zeolite (ZSM-5) | 6N HCl | 100 minutes | $(NH_3)_6 Mo_7O_{24}H_6 (H_2O)_4$ + $Co(NO_3)_2 (H_2O)_6$ | 3.2 | 12.2 | 0.43 | 15.4 |

Conditions of impregnation: Impregnated at room temperature, then dry at 120° C. overnight and calcined at 450° C. for 6 hours ZSM-5 catalysts have also been impregnated with ZnPt. In one embodiment, the catalyst is leached in an aqueous solution, as previously described, prior to impregnation with zinc or platinum. In another embodiment, 5.0 g of zinc nitrate hexahydrate and 0.5 g of hexachloroplatinic acid were dissolved in 18 ml of water. The solution was impregnated to 20 g of ZSM-5 zeolite, then the mixture was dried at 120° C. overnight and calcined at 550° C. for ~6 hrs to generate a 5% ZnPt-zeolite catalyst. Another embodiment used 6.0 g of Zinc nitrate hexahydrate dissolved in 50 ml of water. The solution was impregnated to 60 g of ZSM-5 zeolite. Then the mixture was dried at 120° C. overnight and calcined at 550° C. for ~6 hrs to generate a 2% Zn-zeolite catalyst. Yet another embodiment used 15.0 g of zinc nitrate hexahydrate dissolved in 50 ml of water. The solution was impregnated to 60 g of ZSM-5 zeolite. Then the mixture was dried at 120° C. overnight and calcined at 550° C. for ~6 hrs to generate a 5% Zn-zeolite catalyst. A leached zeolite catalyst was impregnated in another embodiment. 5.0 g of Zinc nitrate hexahydrate was dissolved in 20 ml of water. The solution was impregnated to 20 g of acid leached ZSM-5 zeolite catalyst. Then the mixture was dried at 120° C. overnight and calcined at 550° C. for ~6 hrs.

Catalysts may be impregnated with Zn, Pt, Co, and/or Mo. After impregnation with one or more metals, the sample is dried at 120° C. overnight and calcined at 450° C. for 6 hrs. A Zn, Pt, Co, Mo, CoMo or ZnPt impregnated catalyst provides a zeolite that reduces coke formation and increases sorbitol conversion. By reducing coke formation, catalyst life is increased dramatically and catalyst regeneration is improved.

EXAMPLE 1

Zinc Impregnated Zeolite Catalyst

The combination of zinc and platinum impregnated zeolite improved sorbitol production and reduced coke formation. Going from no Zn impregnation to 5% Zn impregnation reduced total coke formation by about 44%. This dramatic reduction in coke formation leads to greatly increased catalyst life. Not only is catalyst life increased for a single run, but cleaning and regenerating fouled catalyst is also improved. This increases both length of run time for a single catalyst, but also increases the number of times a catalyst may be reused, dramatically reducing catalyst costs.

TABLE 2

Zeolite Impregnation with Zinc

| | Product distribution, wt % | | | | | |
|---|---|---|---|---|---|---|
| Catalyst | Paraffins (C1-C4) | Olefins (C2-C4) | C5+ | CO + $CO_2$ | Total Coke | Sorbitol Conversion |
| Zeolite (ZSM-5) | 2.46 | 9.80 | 38.79 | 44.71 | 4.25 | 94.06 |
| 2% Zn | 3.26 | 10.10 | 38.96 | 44.29 | 3.38 | 95.71 |
| 5% Zn | 4.62 | 9.99 | 37.61 | 44.96 | 2.82 | 96.05 |
| Leached + 5% Zn | 7.36 | 12.58 | 39.74 | 38.84 | 1.48 | 98.24 |

Reaction @ 500° C., atm pressure, with 22 ml/hr 50% sorbitol (8 g total) and 13 ml/hr isopentane, 8 g catalyst Acid leaching reduces coke formation and creates a catalyst with a longer life. By acid leaching the catalyst before metal impregnation, an improved catalyst is generated. The leached zinc catalyst improved sorbitol conversion by approximately 2.3%. The leached Zn-zeolite catalyst achieved over 98% conversion of sorbitol to other products including C5+ hydrocarbons. This demonstrates that leaching the zeolite catalyst and impregnating it with metals improves polyol conversion while reducing coke formation.

EXAMPLE 2

Zinc-Platinum Impregnated Zeolite Catalyst

Addition of platinum to the Zn-catalyst further reduces coke formation.

TABLE 3

Zeolite Impregnation with Zinc and Platinum

| | Product distribution, wt % | | | | | |
|---|---|---|---|---|---|---|
| Catalyst | Paraffins (C1-C4) | Olefins (C2-C4) | C5+ | CO + $CO_2$ | Total Coke | Sorbitol Conversion |
| Zeolite (ZSM-5) | 2.46 | 9.80 | 38.79 | 44.71 | 4.25 | 94.06 |
| Zn-Zeolite | 4.62 | 9.99 | 37.61 | 44.96 | 2.82 | 96.05 |
| ZnPt-Zeolite | 7.40 | 8.46 | 31.02 | 50.92 | 2.21 | 95.71 |

Reaction @ 500°C., atm pressure, with 22 ml/hr 50% sorbitol (8 g total) and 13 ml/hr isopentane, 8 g catalyst.

The ZnPt-zeolite catalyst reduced coke formation by nearly 22%. Although sorbitol conversion was nearly the same with the Zn- and ZnPt-zeolite catalysts, the use of zinc and platinum impregnated zeolite catalyst reduced coke formation without hindering sorbitol conversion with nearly 96 percent conversion. The ZnPt-zeolite catalyst can be used to increase the longevity of the zeolite catalyst during the sorbitol conversion reaction. Polyol conversion to hydrocarbons, especially with these catalysts, generates a high percentage of C5+ hydrocarbons in the gasoline boiling range including aromatic hydrocarbons with increased octane ratings.

EXAMPLE 3

Cobalt-Molybdenum Impregnated Zeolite Catalyst

A zeolite catalyst impregnated with CoMo as described above, dramatically reduced coke formation allowing the production of more product while reducing the amount of undesirable byproducts. Identical ZSM-5 catalysts, one commercial catalyst (T-4480) and a CoMo impregnated on acid leached ZSM-5 catalyst were used under the same reaction conditions to convert sugar alcohols to gasoline. In these tests, the sorbitol was used as a model compound for sugar-alcohols and methanol was co-fed as a hydrogen donor for the reaction. The reaction was carried out at 450° C., 200 psig, with a catalyst loading of 8 g, sorbitol (supplied by ADM as a 70% sorbitol 30% water solution) feed rate of 10 ml/hr and methanol rate of 12 ml/hr. Because coke formation had previously fouled reaction catalysts, the reaction was specifically monitored for coke formation and overall products including sorbitol production. The CoMo impregnated catalyst only produced 1.8 wt % coke on catalyst during processing of 70% sorbitol at 10 ml/hr. The unmodified ZSM-5 catalyst produced 2.7 wt % coke under the same conditions.

TABLE 4

CoMo impregnation of Zeolite Catalyst

| | Product distribution, wt % | | | | | | | |
|---|---|---|---|---|---|---|---|---|
| Catalyst | Paraffins (C1-C4) | Olefins (C2-C4) | C5+ | CO + $CO_2$ | Total Coke | Coke on Catalyst | Sorbitol Conversion | Methanol Conversion |
| Zeolite (ZSM-5) | 16.8 | 3.1 | 50.3 | 23.3 | 6.6 | 2.7 | 99.31 | 100 |
| Impregnated with CoMo | 17.3 | 2.5 | 44.3 | 28.2 | 7.6 | 1.8 | 99.5 | 100 |

Reaction @ 450° C., 200 psig, with 10 ml/hr 70% sorbitol (8 g total) and 12 ml/hr methanol.

CoMo impregnation of the ZSM-5 catalyst improved product formation and reduced coke formation. With a 33% reduction in coke fouling on the catalyst, the CoMo catalyst may be incorporated with less maintenance. This allows the reaction catalyst to be used on a commercial scale for increased times and processing greater volumes and masses of carbohydrates to polyols and gasoline range fuels.

EXAMPLE 4

Hydrogen Gas Over Zeolite Catalyst

A standard zeolite catalyst for hydrocarbon conversion was used with an inert gas, $N_2$, and hydrogen, $H_2$, to convert sugar alcohols to gasoline. There was an insufficient reduction in coke formation (data not shown) when using a $H_2$ co-feed gas over a zeolite catalyst without leaching or metal impregnation. To improve coke reduction, therefore increasing product output with less fouling, further improvements were required.

EXAMPLE 5

Hydrogen Gas Over Zn Impregnated Zeolite Catalyst

Coke deposits on the zeolite catalyst are further reduced when $H_2$ gas is co-fed with the feed streams over the Zn-zeolite catalyst.

TABLE 5

$H_2$ co-feed gas over Zn-Zeolite Catalyst

| Co-feed gas | Product distribution, wt % | | | | | |
|---|---|---|---|---|---|---|
| | Paraffins (C1-C4) | Olefins (C2-C4) | C5+ | CO + CO$_2$ | Total Coke | Sorbitol Conversion |
| Zn with N$_2$ | 4.62 | 9.99 | 37.61 | 44.96 | 2.82 | 96.05 |
| Zn with H$_2$ | 4.37 | 11.45 | 40.70 | 41.26 | 2.22 | 97.05 |

Reaction @ 500° C., atm psig, with 22 ml/hr 50% sorbitol (8 g total) and 13 ml/hr isopentane.

Co-feeding hydrogen with feedstock over the Zn impregnated catalyst reduced coke formation by over 22%. A total of 2.82 wt % of coke were produced in the presence of a zinc impregnated catalyst, the amount of coke produced was further reduced by 22% to 2.22 wt % of total coke with an $H_2$ co-feed gas instead of $N_2$. The reduced coke formation translated into greater sorbitol conversion (increased ~1%) and more importantly, increased the longevity of the catalyst.

EXAMPLE 6

Hydrogen Gas Over CoMo Impregnated Acid Leached Zeolite Catalyst

Coke deposits on the zeolite catalyst are further reduced when $H_2$ gas is co-fed with the feed streams over the CoMo zeolite catalyst.

TABLE 6

$H_2$ co-feed gas over Acid Leached Zeolite Catalyst

| Co-feed gas | Product Paraffins (C1-C4) | Olefins (C2-C4) | C5+ | CO + CO$_2$ | Total Coke | Coke on Catalyst | Sorbitol Conversion | Methanol Conversion |
|---|---|---|---|---|---|---|---|---|
| Zeolite with N$_2$ | 16.8 | 3.1 | 50.3 | 23.3 | 6.6 | 2.7 | 99.31 | 100 |
| CoMo acid leached zeolite with N$_2$ | 17.3 | 2.5 | 44.3 | 28.2 | 7.6 | 1.8 | 99.5 | 100 |
| CoMo acid leached zeolite with H$_2$ | 25.3 | 1.5 | 44.6 | 23.7 | 4.9 | 0.4 | >99 | 100 |

Reaction @ 450° C., 200 psig, with 10 ml/hr 70% sorbitol (8 g total) and 12 ml/hr methanol., 8 g catalyst Coke selectivity was decreased from 1.8% using $N_2$ to 0.4 wt % using $H_2$, over a 75% reduction in the amount of coke fouling the CoMo impregnated acid leached zeolite catalyst with nitrogen. When compared to the original zeolite catalyst with $N_2$, greater than 85% of the coke fouling the catalyst is removed. This dramatic reduction in coke fouling improves not only catalyst longevity, it makes the catalyst easier to clean and regenerate. A larger percentage of the catalyst can be regenerated, because fouled catalyst typically is not regenerated during the refinery cycle. By improving product production and reducing coke fouling, the CoMo-zeolite catalyst becomes a useful tool for commercial conversion of carbohydrates to gasoline fuels. This was not commercially feasible with the standard zeolite catalyst.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Pat. No. 4,097,367, "Conversion of olefinic naphtha," Mobil Oil Corp., Haag and Huang (1978).
2. U.S. Pat. No. 4,338,472, "Catalytic Hydrogenolysis of Alditols to Produce Polyols" Hydrocarbon Research Inc., Sirkar (1985).
3. U.S. Pat. No. 4,496,780, "Hydrocracking of Polyols" UOP Inc., Arena (1985).
4. U.S. Pat. No. 4,503,278, "Process for converting carbohydrates to hydrocarbons," Mobil Oil Corp., Chen and Koenig (1985).
5. U.S. Pat. No. 5,952,259, "Process for making an acid-base leached zeolite catalyst," Phillips Petroleum Co., Drake and Wu (1999).
6. U.S. Pat. No. 6,090,990, "Method of making an improved catalyst containing zeolite treated with boron trichloride, the product from such method, and the use thereof in the conversion of hydrocarbons," ConocoPhillips Co., Yao and Drake (2000).
7. U.S. Pat. No. 6,291,725, "Catalysts and Process for Hydrogenolysis of Sugar Alcohols to Polyols" Battelle Memorial Inst., (2001)
8. U.S. Pat. No. 6,476,218, "Method of preparing a mixture of mannitol and sorbitol by continuous hydrogenation of glucosone," Roquette Freres, Choque and Fleche (2002).
9. U.S. Pat. No. 6,479,713, "Hydrogenolysis of 5-Carbon Sugars, Sugar Alcohols, and Other Methods and Compositions for Reactions Involving Hydrogen" Battelle Memorial Inst., Werpy, et al. (2002)
10. U.S. Pat. No. 6,787,023, "Metal-containing macrostructures of porous inorganic oxide, preparation thereof, and use,"
11. U.S. Pat. No. 6,841,085, "Hydrogenolysis of 6-Carbon Sugars and Other Organic Compounds" Battelle Memorial Inst., (2005)
12. U.S. Pat. No. 7,550,634, "Process for converting triglycerides to hydrocarbons," ConocoPhillips Co., Yao (2009).
13. US2007142633, "Process for converting carbohydrates to hydrocarbons," ConocoPhillips Company, Yao, et al. (2001).
14. US2009217922, "Catalyst for Cellulose Hydrolysis and/or Reduction of Cellulose Hydrolysis Products and Method of Producing Sugar Alcohols From Cellulose," Fukuoka and Dhepe, (2009).
15. U.S. Ser. No. 61/236,347, "Hydrotreating Carbohydrates," ConocoPhillips Company, Sughrue and Yao, (2009).
16. WO02066579, "Method for Producing Aromatic Hydrocarbons," Boreskova Inst Kataliza Sibir, Echevsky (2002).
17. Chianelli, et al., "Periodic trends in hydrodesulfurization: in support of the Sabatier principle", Applied Catalysis, A, volume 227, pages 83-96 (2002).
18. David, et al., "A Review of Catalytic Issues and Process Conditions for Renewable Hydrogen and Alkanes by Aqueous-Phase Reforming of Oxygenated Hydrocarbons Over Supported Metal Catalysts," Appl. Catal. B., 56, 171 (2004)
19. Hamada and Watabe, "More Propylene in FCC Units" Catalyst Research Center, JGC Catalysts and Chemicals Ltd. (2008)
20. Huber, et al., "Renewable Alkanes by Aqueous-Phase Reforming of Biomass-Derived Oxygenates'" Angew. Chem. Int. Ed., 43, 1549-1551 (2004)
21. Huber, et al., " " Angew. Chem. 116, 1575-1577 (2004).
22. Metzger, "Production of Liquid Hydrocarbons from Biomass," Angew. Chem. Int. Ed., 45, 696 (2006)
23. Cortright, et al., "Hydrogen from catalytic reforming of biomass-derived hydrocarbons in liquid water." Nature. 2002 Aug. 29; 418(6901):964-7.
24. Kirk-Othmer Encyclopedia of Chemical Technology, third edition, volume 15, (John Wiley & Sons, New York, 1981).

The invention claimed is:
1. A method of converting carbohydrates to polyols and gasoline boiling range hydrocarbons comprising:
   a) contacting a zinc-platinum or cobalt-molybdenum impregnated zeolite catalyst (ZnPt-zeolite or CoMo-zeolite) with a carbohydrate or polyol;
   b) reacting said carbohydrate or polyol on said catalyst to produce polyols and hydrocarbons; and
   c) separating the polyols and hydrocarbons,
   wherein said hydrocarbons are in the gasoline boiling range between approximately −20° C. and 220° C.
2. The method of claim 1, wherein said carbohydrate is selected from the group consisting of starches, polysaccharides, monosaccharides, dextrose, mannose, galactose, fructose, sucrose, and combinations thereof.
3. The method of claim 1, wherein said polyol is selected from the group consisting of maltitol, sorbitol, xylitol, isomalt and/or isomers and/or combinations thereof.
4. The method of claim 1, wherein said zeolite catalyst is selected from the group consisting of HZSM-5, ZSM-5, ZSM-8, ZSM-11, ZSM-12, ZSM-35, ZSM-38, MFI, and pentasil.
5. The method of claim 1, wherein said reaction (b) comprises a hydrogen co-feed gas.
6. The method of claim 1, wherein said hydrocarbon is a hydrocarbon with C1, C2, C3, C4, C5, C6, C7, C8, C9, C10, C11 or C12 hydrocarbons.
7. The method of claim 1, wherein said hydrocarbon has a boiling range selected from the group consisting of between approximately minus 20° C. to 220° C., between approximately minus 20° C. to 120° C., between approximately minus 20° C. to 196° C., between approximately 35° C. to 160° C., and between approximately 140° C. to 220° C.
8. The method of claim 1, wherein said hydrocarbon is selected from the group consisting of alkanes, cycloalkanes, alkenes, and aromatic hydrocarbons.
9. The method of claim 8, wherein said hydrocarbon is further selected from the group consisting of toulene, xylene, pentane, trimethylbenzenes, benzene, butane, ethylbenzene, heptane, cyclohexane, hexane, octane, naphthalene, isopentane, and styrene.
10. A method of converting carbohydrates to gasoline boiling range hydrocarbons comprising:
   a) contacting a zinc-platinum or cobalt-molybdenum impregnated zeolite (ZnPt-zeolite or CoMo-zeolite) catalyst with a carbohydrate;
   b) reacting said carbohydrate on said catalyst to produce hydrocarbons; and
   c) purifying the hydrocarbons from the reaction (b),
   wherein said hydrocarbons are in the gasoline boiling range between approximately −20° C. and 220° C.

11. The method of claim 10, wherein said carbohydrate is selected from the group consisting of starches, polysaccharides, monosaccharides, dextrose, mannose, galactose, fructose, sucrose, and combinations thereof.

12. The method of claim 10, wherein said zeolite catalyst is selected from the group consisting of HZSM-5, ZSM-5, ZSM-8, ZSM-11, ZSM-12, ZSM-35, ZSM-38, MFI, and pentasil.

13. The method of claim 10, wherein said reaction (b) comprises a hydrogen co-feed gas.

14. The method of claim 10, wherein said hydrocarbon is a hydrocarbon with C1, C2, C3, C4, C5, C6, C7, C8, C9, C10, C11 or C12 hydrocarbons.

15. The method of claim 10, wherein said hydrocarbon has a boiling range selected from the group consisting of between approximately minus 20° C. to 220° C., between approximately minus 20° C. to 120° C., between approximately minus 20° C. to 196° C., between approximately 35° C. to 160° C., and between approximately 140° C. to 220° C.

16. The method of claim 10, wherein said hydrocarbon is selected from the group consisting of alkanes, cycloalkanes, alkenes, and aromatic hydrocarbons.

17. The method of claim 16, wherein said hydrocarbon is further selected from the group consisting of toluene, xylene, pentane, trimethylbenzenes, benzene, butane, ethylbenzene, heptane, cyclohexane, hexane, octane, naphthalene, isopentane, and styrene.

18. A method of converting polyols to gasoline boiling range hydrocarbons comprising:
   a) contacting a zinc-platinum or cobalt-molybdenum impregnated zeolite catalyst with a polyol;
   b) reacting said polyol on said catalyst to produce hydrocarbons; and
   c) purifying the hydrocarbons from the reaction (b),
   wherein said hydrocarbons are in the gasoline boiling range between approximately −20° C. and 220° C.

19. The method of claim 18, wherein said polyol is selected from the group consisting of maltitol, sorbitol, xylitol, isomalt and/or isomers and/or combinations thereof.

20. The method of claim 18, wherein said zeolite catalyst is selected from the group consisting of HZSM-5, ZSM-5, ZSM-8, ZSM-11, ZSM-12, ZSM-35, ZSM-38, MFI, and pentasil.

21. The method of claim 18, wherein said reaction (b) comprises a hydrogen co-feed gas.

22. The method of claim 18, wherein said hydrocarbon is a hydrocarbon with C2, C3, C4, C5, C6, C7, C8, C9, C10, C11 or C12 hydrocarbons.

23. The method of claim 18, wherein said hydrocarbon has a boiling range selected from the group consisting of between approximately minus 20° C. to 220° C., between approximately minus 20° C. to 120° C., between approximately minus 20° C. to 196° C., between approximately 35° C. to 160° C., and between approximately 140° C. to 220° C.

24. The method of claim 18, wherein said hydrocarbon is selected from the group consisting of alkanes, cycloalkanes, alkenes, and aromatic hydrocarbons.

25. The method of claim 24, wherein said hydrocarbon is further selected from the group consisting of toluene, xylene, pentane, trimethylbenzenes, benzene, butane, ethylbenzene, heptane, cyclohexane, hexane, octane, naphthalene, isopentane, and styrene.

26. A method of converting polyols to hydrocarbons comprising:
   a) contacting a leached zeolite catalyst impregnated with zinc, cobalt, molybdenum, platinum or combinations thereof,
   b) reacting said polyol on said catalyst to produce hydrocarbons, and
   c) purifying hydrocarbons from the reaction,
   wherein said reaction temperature is between 400 and 550° C., said reaction pressure is between 1 and 250 psig, and said polyol flow rate is between approximately 0.1 and 5 ml/hr/g catalyst.

27. The method of claim 26, wherein said polyol is co-fed with between approximately 1 and 2.5 ml/hr/mg catalyst liquid co-feed.

28. The method of claim 27, wherein said liquid co-feed is methanol or pentane.

29. The method of claim 26, wherein said polyol is an aqueous solution between 30 and 95% sorbitol.

30. The method of claim 26, wherein said reaction temperature is approximately 450° C., said reaction pressure is approximately 200 psig, and said polyol is 1.3 ml/hr 70% sorbitol per gram catalyst.

31. The method of claim 30, wherein said reaction comprises a co-feed of 1.5 ml/hr methanol per gram catalyst.

32. The method of claim 26, wherein said reaction temperature is approximately 500° C., said pressure is approximately 14 psig, and said polyol is approximated 3 ml/hr 50% sorbitol per gram catalyst.

33. The method of claim 32, wherein said reaction comprises a co-feed of 1.6 ml/hr isopentane per gram catalyst.

34. The method of claim 26, wherein said polyol is selected from the group consisting of maltitol, sorbitol, xylitol, isomalt and/or isomers and/or combinations thereof.

35. The method of claim 26, wherein said zeolite catalyst is selected from the group consisting of HZSM-5, ZSM-5, ZSM-8, ZSM-11, ZSM-12, ZSM-35, ZSM-38, MFI, and pentasil.

36. The method of claim 26, wherein said reaction (b) comprises a hydrogen co-feed gas.

37. The method of claim 26, wherein said hydrocarbon is a hydrocarbon with C2, C3, C4, C5, C6, C7, C8, C9, C10, C11 or C12 hydrocarbons.

38. The method of claim 26, wherein said hydrocarbon has a boiling range selected from the group consisting of between approximately minus 20° C. to 220° C., between approximately minus 20° C. to 120° C., between approximately minus 20° C. to 196° C., between approximately 35° C. to 160° C., and between approximately 140° C. to 220° C.

39. The method of claim 26, wherein said hydrocarbon is selected from the group consisting of alkanes, cycloalkanes, alkenes, and aromatic hydrocarbons.

40. The method of claim 39, wherein said hydrocarbon is further selected from the group consisting of toluene, xylene, pentane, trimethylbenzenes, benzene, butane, ethylbenzene, heptane, cyclohexane, hexane, octane, naphthalene, isopentane, and styrene.

* * * * *